(12) United States Patent
Munz et al.

(10) Patent No.: US 11,220,174 B2
(45) Date of Patent: Jan. 11, 2022

(54) WHEEL HUB DRIVE

(71) Applicant: ZIEHL-ABEGG AUTOMOTIVE GMBH & CO. KG, Kupferzell (DE)

(72) Inventors: Maximilian Munz, Schwäbisch Hall-Hessental (DE); Jordi Mas Gili, Künzelsau (DE); Swen Gauditz, Obersontheim (DE); Albaro Ponce-Heredia, Maintal (DE); Roland Hoppenstedt, Zweiflingen (DE); Edgar Mayer, Kupferzell (DE); Sascha Klett, Oppenweiler (DE); Isabell Kakuschke, Niedernhall (DE); Uli Vetter, Kunzelsau (DE); Alexander Haag, Ingelfingen (DE); Fabian Frueh, Crailsheim (DE); Daniel Buerkert, Waldenburg (DE)

(73) Assignee: ZIEHL-ABEGG AUTOMOTIVE GMBH & CO. KG, Kupferzell (DE)

(*) Notice: Subject to any disclaimer, the term of this patent is extended or adjusted under 35 U.S.C. 154(b) by 223 days.

(21) Appl. No.: 16/322,869

(22) PCT Filed: Jul. 7, 2017

(86) PCT No.: PCT/DE2017/200064
§ 371 (c)(1),
(2) Date: Feb. 1, 2019

(87) PCT Pub. No.: WO2018/024295
PCT Pub. Date: Feb. 8, 2018

(65) Prior Publication Data
US 2020/0324640 A1  Oct. 15, 2020

(30) Foreign Application Priority Data

Aug. 2, 2016 (DE) .................... 10 2016 214 269.0

(51) Int. Cl.
*B60K 7/00* (2006.01)
*B60B 27/00* (2006.01)
(Continued)

(52) U.S. Cl.
CPC ........ *B60K 7/0007* (2013.01); *B60B 27/0015* (2013.01); *B60B 27/0052* (2013.01);
(Continued)

(58) Field of Classification Search
CPC .............. B60K 7/0007; B62B 27/0015; B62B 27/0057
See application file for complete search history.

(56) References Cited

U.S. PATENT DOCUMENTS

2009/0095578 A1* 4/2009 Besler ................. F16D 65/0043
188/72.5
2014/0180518 A1* 6/2014 Hayashi ................ B60W 30/14
701/22
(Continued)

FOREIGN PATENT DOCUMENTS

DE          4110638     10/1992
DE       102004044688    5/2006
(Continued)

*Primary Examiner* — James A Shriver, II
*Assistant Examiner* — James J Triggs
(74) *Attorney, Agent, or Firm* — Jason P. Mueller; FisherBroyles, LLP

(57) ABSTRACT

A wheel hub drive as a direct drive of a wheel of a vehicle having an electric motor preferably designed as a permanent-magnet synchronous motor (PMSM)—external rotor motor—which is substantially arranged in the region within the wheel, wherein a rotating part of a friction brake is frictionally, interlockingly, and/or integrally connected to the motor for braking. The rotating part is operatively connected to the rotor of the motor, directly or indirectly, from outside of the motor.

10 Claims, 2 Drawing Sheets

(51) Int. Cl.
*H02K 7/00* (2006.01)
*H02K 7/102* (2006.01)
*H02K 21/22* (2006.01)
*B60B 11/00* (2006.01)

(52) U.S. Cl.
CPC ......... *B60B 27/0057* (2013.01); *H02K 7/006* (2013.01); *H02K 7/102* (2013.01); *H02K 21/22* (2013.01); *B60B 11/00* (2013.01); *B60K 2007/003* (2013.01); *B60K 2007/0092* (2013.01)

(56) References Cited

U.S. PATENT DOCUMENTS

| | | | |
|---|---|---|---|
| 2014/0323259 A1* | 10/2014 | Sugiyama | B60K 17/12 475/150 |
| 2015/0108823 A1 | 4/2015 | Figuered et al. | |
| 2015/0137669 A1* | 5/2015 | Lampic | B60K 7/0007 310/67 R |

FOREIGN PATENT DOCUMENTS

| | | |
|---|---|---|
| DE | 102008004085 | 7/2009 |
| DE | 102008011870 | 9/2009 |
| DE | 102013200117 | 7/2014 |
| DE | 102014209177 | 11/2015 |
| EP | 0865978 | 9/1998 |
| EP | 3325301 B1 | 12/2020 |
| JP | 2008307917 | 12/2008 |
| JP | 4391884 B2 | 12/2009 |

* cited by examiner

WHEEL HUB DRIVE

CROSS-REFERENCE TO RELATED APPLICATIONS

This application is a national stage entry application under 35 U.S.C. 371 of PCT Patent Application No. PCT/DE2017/200064, filed Jul. 7, 2017, which claims priority to German Patent Application No. 10 2016 214 269.0, filed Aug. 2, 2016, the entire contents of each of which are incorporated herein by reference.

STATEMENT REGARDING FEDERALLY SPONSORED RESEARCH OR DEVELOPMENT

N/A

THE NAMES OF THE PARTIES TO A JOINT RESEARCH AGREEMENT

N/A

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

N/A

BACKGROUND

(1) Field

The present disclosure relates to a wheel hub drive as a direct drive of a wheel of a vehicle, in particular a commercial vehicle, having an electric motor preferably designed as a permanent-magnet synchronous motor (PMSM)—external rotor motor—which is substantially arranged in the region within the wheel, wherein a rotating part of a friction brake is frictionally and/or interlockingly and/or integrally connected to the motor for braking.

(2) Description of the Related Art Including Information Disclosed Under 37 CFR 1.97 and 37 CFR 1.98

With municipal commercial vehicles, the drive design for electric motors (e-motors) has a significant amount of drive technology. While a gearbox for torque and gear speed ratios is engaged downstream of the combustion engine (ICE) with conventional drive motors, usually working with diesel or gas, a mechanical gear ratio can be completely omitted with e-motors, namely due to a corresponding motor characteristic curve. Within the scope of the drive design having electric engines, one or more wheel hub drives are used as a direct drive for the wheels of the commercial vehicle. Such direct e-drives have an electric external rotor motor as a permanent-magnet synchronous motor (PMSM).

External rotor motors as rotationally driven electric direct drives can essentially be used with electric vehicles, series hybrid vehicles, particularly with city buses as rigid or articulated buses, with airport buses, as well as with special vehicles and commercial vehicles.

Reference is made to DE 41 10 638 A1, merely as an example, with respect to such a wheel hub drive. Numerous manifestations of such a wheel hub drive are known as well from practical experience.

With known wheel hub drives, an integral friction brake subject to wear is provided. To this end, an interior, rotating shaft is frictionally and/or interlockingly connected to the wheel hub motor in the e-motor. Due to the forces and torques occurring during braking/accelerating, the shaft should have extraordinarily large dimensions and/or be made of a high-strength material, particularly high-strength steel, in order to permanently withstand load from the wheel contact and braking. In doing so, there should be optimization in the force flow during mechanical braking and accelerating between the braking system, the drive, and the road.

With systems of the previously described type, in which a rotating shaft extends in the center through the e-motor or the motor, the mounting is connected to the interior shaft and therefore must accommodate strong deformations and particularly tilted positions with respect to the wheel contact force.

A further problem results from the requirement according to which the air gap between the stator winding and the rotor magnets must be kept constant during operation. To this end, a thin-section bearing must be used with the known wheel hub drives in order to minimize bending and deformations in the rotor head.

Finally, a converter may be arranged concentrically around the rotating shaft or the bearing component (integrated arrangement of the converter) with the known wheel hub drives, especially since the only space is available there, with an integrated arrangement of the converter. This imposes on the designer a converter design that is not optimum for costs and production. In addition, such a designed and arranged converter can only be accessed for maintenance and/or replacement during removal of the wheel hub drive unit from the axle drive module. This is extremely expensive and not maintenance-friendly.

BRIEF SUMMARY OF THE DISCLOSURE

In light of the previous statements, the object of the disclosure is to obtain a wheel hub drive that differs from the wheel hub drives known from practical use. The difference should result from an optimization of the force flow between the braking system, drive, and road during mechanical braking. In addition, the wheel hub drive according to the disclosure should be simple in design and possible to maintain with less expense. Finally, sufficient stability in the individual components should also be ensured during peak loads.

The previous object is achieved by the features of claim 1. Accordingly, the type-defining wheel hub drive is characterized in that the rotating part is operatively connected to the rotor of the motor, directly or indirectly, from outside of the motor.

It has been recognized that a friction brake with interior shaft is fragile, on the one hand, and does not provide significant installation space, on the other hand. In a departure from the solution known from the prior art, a motor design has been created in accordance with the disclosure, according to which the rotating part of the braking system is operatively connected to the rotor of the motor, directly or indirectly, from outside the motor. Thus, the forces are not transferred, for example, by a somewhat thick shaft limited in size. Instead, the rotating part is preferably directly connected to the rotor of the motor via a flange. An interior shaft is not necessary within the scope of the motor design according to the disclosure. The load is supported by means of a larger geometry such that the material strength can even be reduced. In any case, the material strength no longer dominates the material selection for the component acting between the rotating part of the friction brake and the rotor of the motor.

Specifically, it is advantageous when a pipe/cylinder extends to between the rotating part of the friction brake and the flange, wherein the flange may be a component of the pipe/cylinder.

It should be noted that the rotating part may be the braking disc of a disc braking system. Other components may also be operatively arranged in between. However, a direct connection is advantageous.

The mounting of the rotating part is preferably accomplished along the motor axis, corresponding to the width of the rotor at the end or close to the end of the rotor, specifically on the nonrotating stator carrier. This means that the mounting is stably supported on larger diameters, on a fixed component on the interior instead of a rotating shaft (contrary to the prior art). The main mounting takes place along the motor axis, whereby tilted positions and deformations in the supporting components are greatly reduced, if not excluded altogether.

The required air gap between the fixed and moving parts is ensured by means of the modified mounting design and the closed rotor design. It is subjected to less fluctuations than in the prior art and can thus be designed smaller, which then has a positive effect on the power density and the running performance of the e-motor.

A feature in accordance with the disclosure, according to which the rotating part is operatively connected, directly or indirectly, to the rotor of the motor from the outside, means that an interior rotating shaft is not necessary. Consequently, a component-free interior is created within the stator, into which an internal converter and optionally other electric/electronic components can be integrated. Contrary to the prior art, no coaxial design of the converter and the electric/electronic components is necessary. Instead, the component-free interior enables practically any economically producible geometric shapes of the converter and other electric/electronic components, which can be housed there as integral components.

Within the scope of a further alternative or as a supplement, it is also possible to use the component-free interior of the stator to house an additional electromagnetic motor circuit, for example an internal rotor. Both motor circuits can preferably be operated by means of one or more external converters. In other words, the winding and magnets of the additional e-motor can be arranged in the component-free interior, wherein the two motor circuits can be operated jointly or independently of one another via the internal and/or external converter.

The interior of the stator, with the electric/electronic components arranged therein and optionally with the internal rotor, then provide an easily accessible inspection opening, namely for easy maintenance and/or repair. To this end, a removable flange may be provided on the wheel-side or road-side of the e-motor, whereby the accessibility to the converter and optionally to the other electric/electronic components is improved. Within the scope of such accessibility, the expenses for maintenance, repairs, and replacements are greatly reduced.

It should be noted that the previously mentioned improved accessibility via flange requires that it be possible for the rotor to be supported on the stator carrier, after removal of the flange. This is preferably ensured via a corresponding arrangement of the bearing such that the removal of the flange has no effect on the positioning of the components. Otherwise, the nominal gap between the rotor and the stator carrier must be designed smaller at a defined support point than the air gap between the rotor magnets and the stator winding. Within the scope of such a design, the flange can be easily removed without damage, whereby access is obtained.

Finally, it should be noted that the previously described wheel hub motor is suitable as a drive for any vehicles, particularly for commercial vehicles and particularly with dual wheel rims due to the required width of the rims.

There are then various options for designing and enhancing the teaching of the present disclosure in an advantageous manner. To this end, reference is made, on the one hand, to the claims and, on the other hand, to the subsequent explanation of exemplary embodiments of the disclosure by means of the drawings. In conjunction with the explanation of exemplary embodiments of the disclosure by means of the drawings, embodiments and further developments of the teaching are also generally explained.

BRIEF DESCRIPTION OF THE SEVERAL VIEWS OF THE DRAWINGS

In a schematic section drawing.

DETAILED DESCRIPTION OF THE DISCLOSURE

Figure 1:
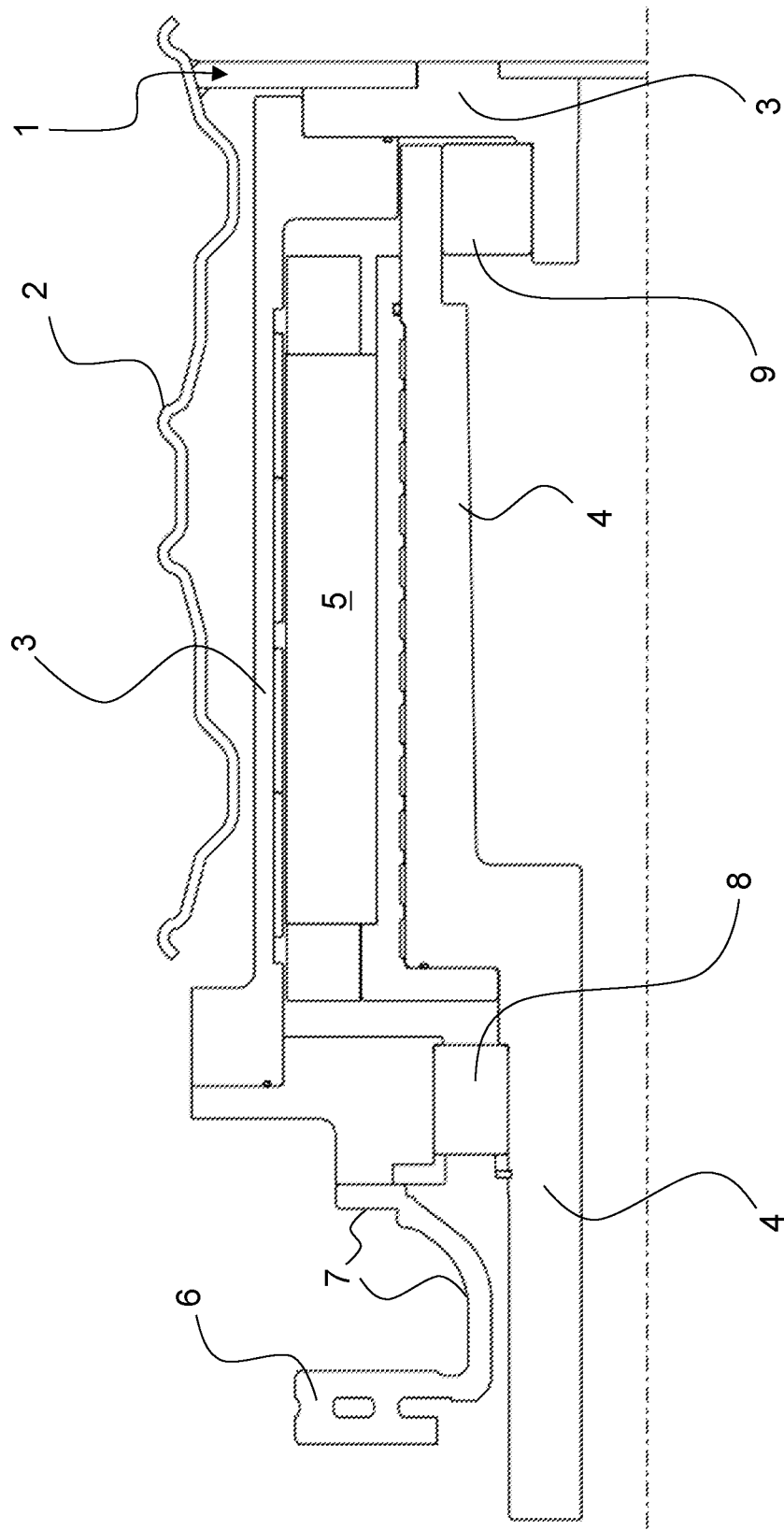
FIG. 1 shows, in part, an exemplary embodiment of a wheel hub drive according to the disclosure having an external rotor motor; and In a schematic section drawing.

In a schematic section drawing, FIG. 1 shows, in part, a wheel hub drive according to the disclosure having an external rotor motor, wherein the wheel hub drive is allocated to a rim 1 for dual tires. The rim 1 is only indicated with its rim well 2 and its connection to the drive.

The wheel hub drive comprises, as substantial components, a rotor 3 connected to the rim 1 in a torsionally-resistant manner, which can be implemented in multiple parts. The stator 4 is arranged within the rotor 3 (external rotor motor) as a nonrotating component. The windings and cooling sleeve 5 of the stator 4 are indicated.

While a shaft connected to a brake disc extends axially through the e-motor in the prior art, a completely different motor design is implemented here, according to which namely the rotating part of the friction brake, in this case the brake disc 6, is connected directly to the rotor 3 from outside of the motor, specifically via a flange 7. The flange 7 may be a separate or integral component. The connection to the rotor may likewise be implemented in any manner, namely frictionally and/or interlockingly and/or integrally connected.

Figure 2:
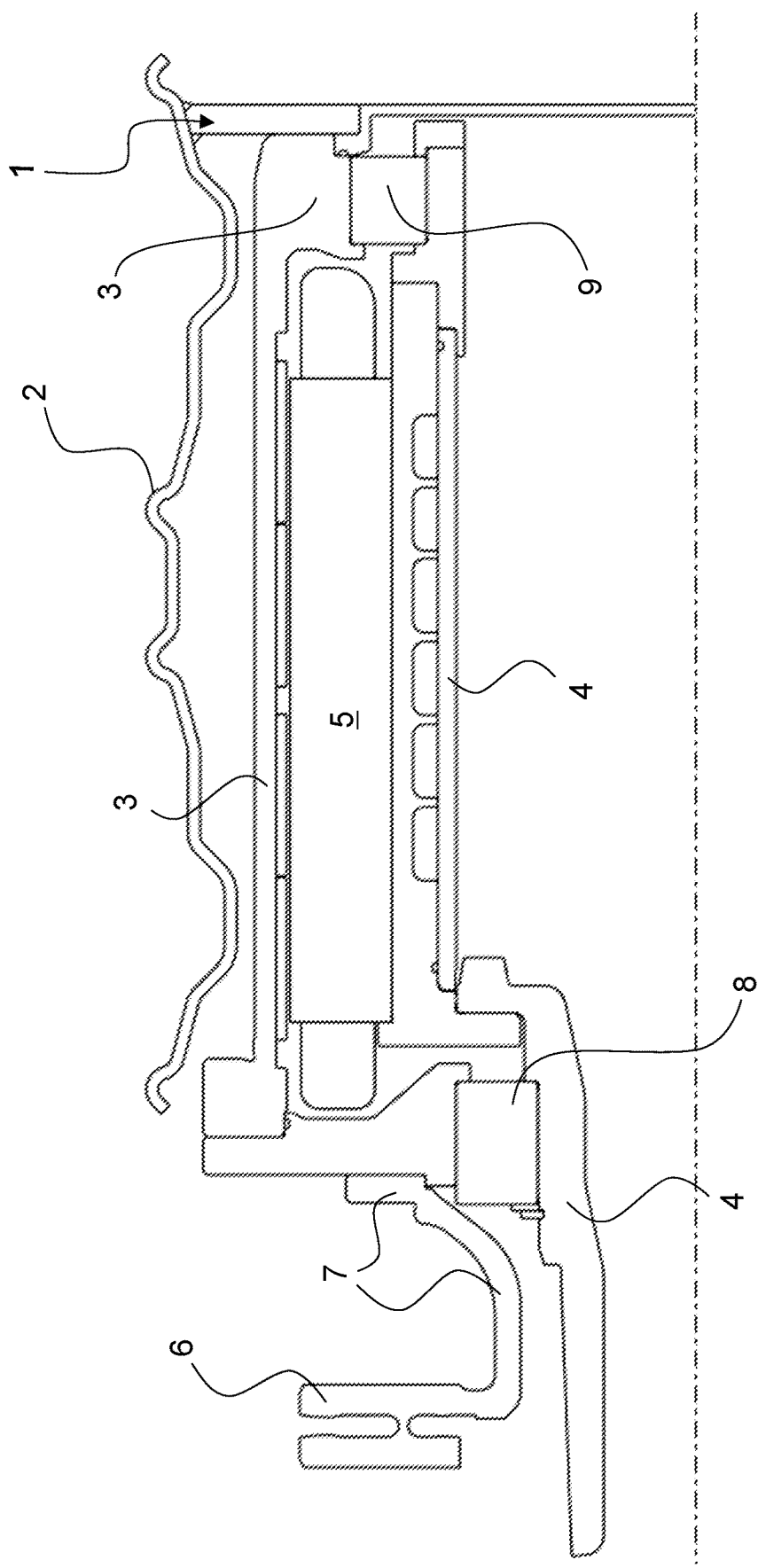
FIG. 2 shows, in part, a variant of the wheel hub drive according to the disclosure, in which the mounting is supported, in the interior, on fixed components.

FIG. 2 shows a variant of the wheel hub drive according to the disclosure, in which the mounting (8, 9) is stably supported, in the interior, on fixed components. Contrary to this, FIG. 1 shows a bearing arrangement with a bearing (9) supported so as to rotate on the inner ring. Accordingly, the bearings 8, 9 are positioned, according to FIG. 2, on the exterior, to the extent possible, with consideration of the width of the rotor, and operate between the fixed stator 4 and the rotating rotor 3, which is facing the friction brake on the exterior, allocated to the flange 7 and thus to the rotating part and/or the brake disc 6 of the friction brake.

In light of the general description and the previous description of figures, the advantages and the designs according to the disclosure are summarized as follows again, in contrast to the prior art:

According to the design according to the disclosure, the mounting of rotating inner rings on a shaft is converted to fixed inner rings on a shaft and/or rotating inner rings on a flange. Contrary to a shaft, a flange is characterized by a significantly larger "diameter to length" ratio. To this end, the bearings are shifted to a position as far from the axis as possible, which defines the end of the rotating motor part. This makes it possible to connect the rotating part of the friction brake (brake disc of the disc brake system or brake drum of the drum brake system) to a large rotating flange, directly on the rotor. High braking torques and system-constrained righting moments of the disc brake system are then supported by means of a larger geometry and thus a higher resistance torque. The material strength can then be reduced.

Alternatively, the material used and/or the material thickness can be reduced to achieve a lower weight. This is to be gauged with consideration of the cost, weight, and service life factors.

According to the disclosure, mounting on larger diameters is supported, namely, on the interior on fixed components, instead of on a rotating shaft, according to the prior art. Thus, the arrangement according to the disclosure is more stable. The main mounting is designed to be along the motor axis, according to the width of the rotor. Tilted positions and deformations in the mounted components are greatly reduced due to the geometric form.

The air gap is ensured permanently by means of the modified mounting design and is subject to less fluctuations than in the prior art. The arrangement can thus be more compact, which has a positive effect on the power density and running performance of the e-motor.

Omission of the interior rotating shaft results in a larger hollow interior, which is not penetrated by any problematic geometry. This makes it possible to form an integrated converter in almost any geometric shape and that is thus more economical to produce.

Alternatively or in addition, the existing installation space may accommodate another electromagnetic motor circuit (i.e. winding and magnets, optionally as an internal rotor as well). Both motor circuits can be operated by means of one or more internal and/or external converters.

An internal bearing with clearance fit on the outer diameter up to the stator carrier makes it possible to implement a removable flange on the road-side of the motor, which is favorable for accessing the converter. This greatly reduces the expense for maintenance and replacement. To this end, the rotor must be supported on the stator carrier after removal of the flange. The nominal gap between the rotor and the stator carrier should be designed smaller than the air gap between the rotor magnets and the stator winding. Thus, the flange can be removed without damaging the motor. There should be a lead-in chamfer for the flange on the rotor. Centering of the flange on the rotor should be implemented before centering of the bearing on the stator carrier.

With regard to further advantageous designs of the teaching according to the disclosure, reference is made, to avoid repetition, to the general part of the description and to the attached claims.

Finally, express reference is made regarding the fact that the previously described exemplary embodiments of the teaching according to the disclosure is provided merely for explanation; however, it is not limited to the exemplary embodiments disclosed herein.

LIST OF REFERENCE NUMERALS

1 Rim, dual rim
2 Rim well
3 Rotor (of the e-motor)
4 Stator (of the e-motor)
5 Windings, cooling sleeve (of the stator)
6 Brake disc (rotating part of the friction brake)
7 Flange (for the connection between the rotating part of the friction brake and the rotor)
8 Bearing, B-side
9 Bearing, A-side

The invention claimed is:

1. A wheel hub drive as a direct drive of a wheel of a vehicle, comprising:
    an electric external rotor motor as a permanent-magnet synchronous motor (PMSM) which is substantially arranged in the region within the wheel, the external rotor motor having:
        a rotor attached to an inside surface of a wheel rim, the rotor being configured to rotate with the wheel rim; and
        a non-rotating stator disposed within an interior of the rotor, wherein operation of the stator induces rotation of the rotor and wheel rim;
    a friction brake, wherein a rotating part of a friction brake is frictionally, interlockingly, integrally connected to the motor for braking, wherein the rotating part is operatively connected to the rotor of the motor, directly or indirectly, from outside of the motor.

2. The wheel hub drive according to claim 1, wherein the rotating part is directly connected to the rotor of the motor via a flange.

3. The wheel hub drive according to claim 2, wherein a pipe/cylinder extends between the rotating part and the flange, or the flange is a component of a pipe/cylinder.

4. The wheel hub drive according to claim 1, wherein the rotating part is a brake disc of a disc brake system.

5. The wheel hub drive according to claim 1, wherein the rotating part is a brake drum of a drum brake system.

6. The wheel hub drive according to claim 1, wherein a mounting of the rotating part is along a motor axis, corresponding to a width of the rotor at an end or close to the end of the rotor, on a nonrotating stator carrier.

7. The wheel hub drive according to claim 1, wherein an internal converter and optionally other electric/electronic components are integrated into a component-free interior of a stator.

8. The wheel hub drive according to claim 1, wherein the motor includes an electromagnetic motor circuit, and the wheel hub drive further comprises an additional electromagnetic motor circuit, designed as an internal rotor that is housed in a component-free interior of a stator, wherein the two motor circuits are operable by means of one or more external converters.

9. The wheel hub drive according to claim 1, wherein the motor has a removable flange on an outside/wheel-side, and wherein removal of the removable flange makes an interior of the motor, including a converter, electric/electronic systems, or a motor circuit, accessible.

10. The wheel hub drive according to claim 1, wherein the wheel rim is a dual wheel rim for a dual tire.

\* \* \* \* \*